March 22, 1927.

T. M. FINLEY ET AL 1,621,976

SELF LUBRICATING PITMAN

Original Filed Jan. 14, 1920   3 Sheets-Sheet 2

Inventor
T. M. Finley.
A. W. Brown.

By Harry F. Riley, Attorney

March 22, 1927.
T. M. FINLEY ET AL
1,621,976
SELF LUBRICATING PITMAN
Original Filed Jan. 14, 1920   3 Sheets-Sheet 3
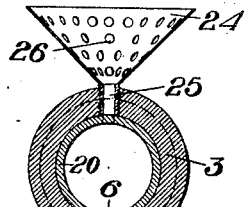
Fig. 6.
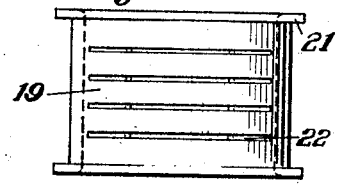
Fig. 4.
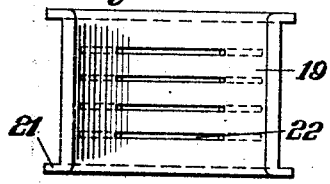
Fig. 5.
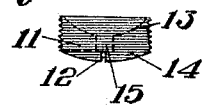
Fig. 7.
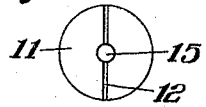
Fig. 8.
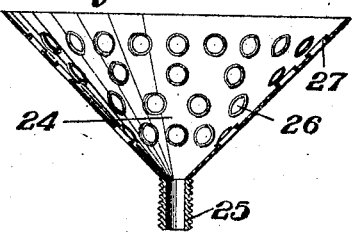
Fig. 9.
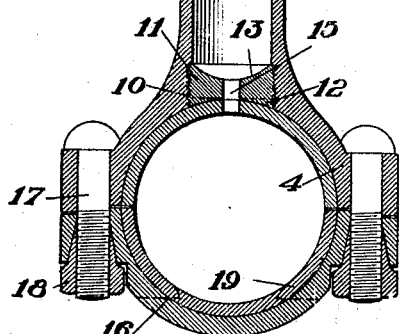
Inventor
T. M. Finley.
A. W. Brown.
By Harry F. Riley
Attorney Patented Mar. 22, 1927.

1,621,976

UNITED STATES PATENT OFFICE.

THOMAS M. FINLEY AND ALLEN W. BROWN, OF ST. LOUIS, MISSOURI.

SELF-LUBRICATING PITMAN.

Original application filed January 14, 1920, Serial No. 351,346. Divided and this application filed January 27, 1920. Serial No. 354,454.

The invention relates to a self lubricating pitman and is a division of an application filed by us this 14th day of January, 1920, Serial No. 351,346.

The object of the present invention is to provide a simple, practical and efficient self lubricating pitman of strong, durable and comparatively inexpensive construction designed particularly for use on internal combustion engines but adapted to be advantageously employed on the connecting rod of any similar engine or motor and capable of splashing or flowing or throwing upward a portion of the lubricant within the crank case and of catching the said lubricant and of feeding the same to the upper and lower bearings of the connecting rod or pitman whereby the upper and lower or inner and outer connecting rod bearings will be maintained in a properly lubricated condition.

It is also an object of the invention to equip the pitman or connecting rod with a lubricant receptacle adapted to catch and retain the lubricant and permit the same to pass inwardly into it at the top and sides and preventing the lubricant from escaping from it so that the lubricant will be fed to the bearings of the connecting rod or pitman.

With these and other objects in view, the invention consists in the construction and novel combination and arrangement of parts hereinafter fully described, illustrated in the accompanying drawings and pointed out in the claims hereto appended, it being understood that various changes in the form, proportion, and minor details of construction within the scope of the claims may be resorted to without departing from the spirit or sacrificing any of the advantages of the invention.

In the drawings, in which like characters of reference designate corresponding parts in the several figures:

Figures 4 and 5 are detail views of the bushing of the lower bearing.

Figure 6 is a longitudinal sectional view of the connecting rod or pitman.

Figures 7 and 8 are detail views of a threaded plug.

Figure 9 is a detail view of the tapered receptacle.

Figure 1:
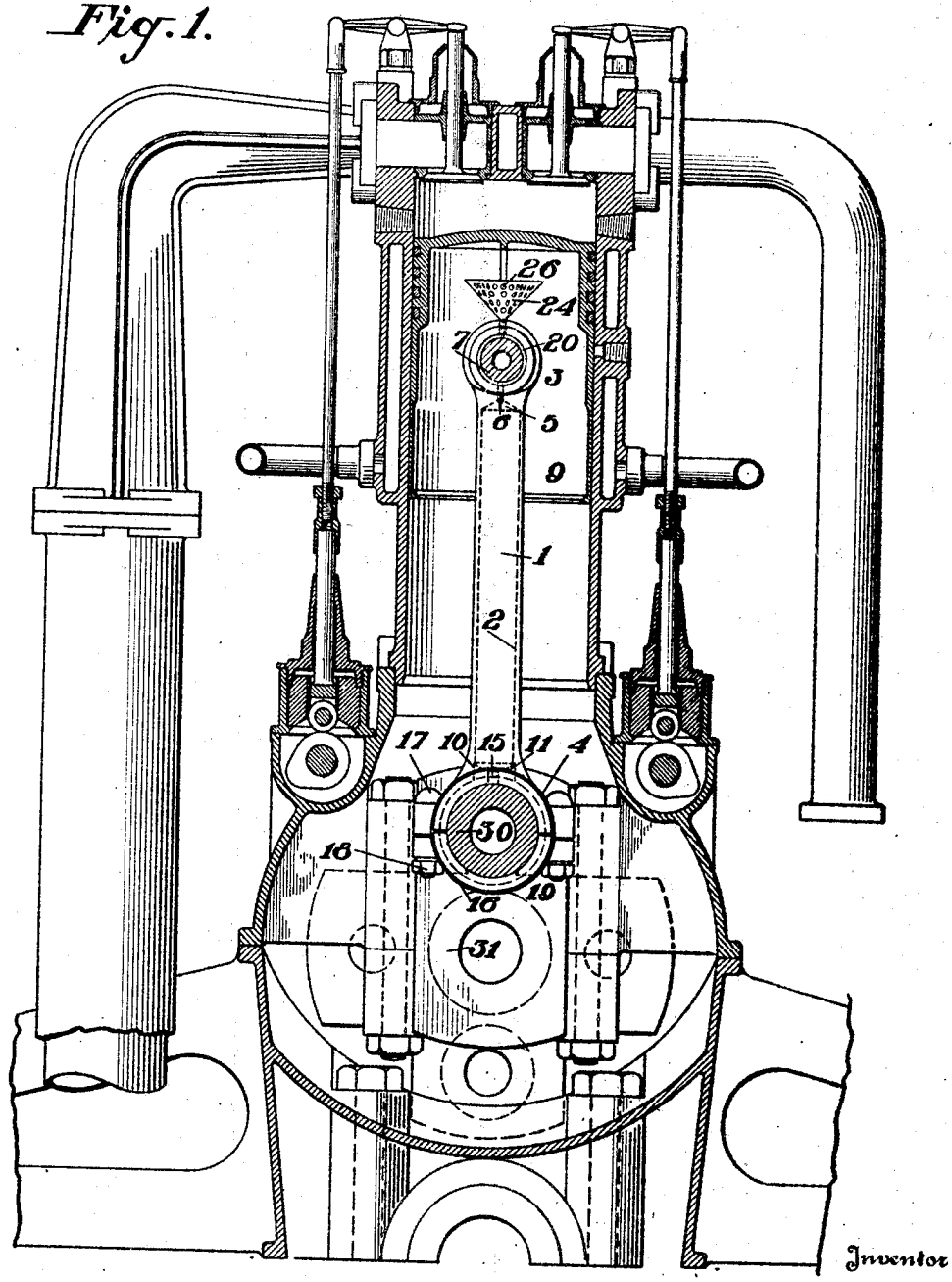
Figure 1 is a vertical, sectional view of a cylinder and piston provided with a self lubricating connecting rod or pitman constructed in accordance with this invention.
Figure 2:
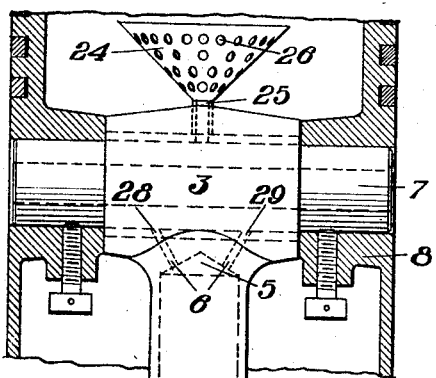
Figure 2 is a front elevation of the connecting rod or pitman.
Figure 3:
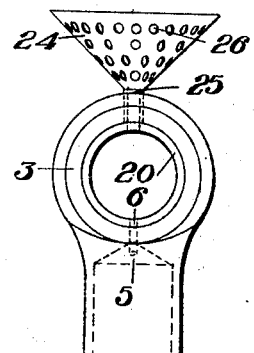
Figure 3 is a side elevation of the same.

The self-lubricating pitman or connecting rod 1 which is designed for use in connection with the tandem motor power unit of the aforesaid application may of course be employed in various types of engines and motors.

The connecting rod 1 which is hollow to form a lubricant passage 2 is provided with upper and lower bearings 3 and 4, and the said lubricant passage extends from the upper bearing to the lower bearing and is preferably tapered or dome-shaped at the top at 5 and upwardly diverging bores or branch passages 6 extend from the dome-shaped top to the upper bearing 3.

This arrangement provides inclined surfaces for the lubricant and facilitates the flow of the same from the upper bearing to the lower bearing. The upper bearing receives a pivot pin 7 which extends from the upper end of the connecting rod and has its terminal portions arranged in bearings 8 of a piston 9. The upper end of the connecting rod is enlarged as shown and fits snugly between the side bearings 8 of the piston 9.

The hollow connecting rod is provided at the lower end of the passage 2 with threads 10 and a threaded plug 11 is screwed into the lower end of the passage 2. The plug which is provided in its lower face with a groove 12 to receive a suitable tool to enable it to be readily screwed into and out of the lower threaded end of the passage 2, is provided with upper and lower concavities 13 and 14 and it has a central opening 15 for the passage of the lubricant to permit the same to flow to the lower bearing 4. The recessing of the upper and lower faces of the threaded plug provides upper and lower concave faces which permit the ready flow of the lubricant to and from the central opening or passage 15.

The lower bearing 4 is sectional, being provided with a removable lower section 16 detachably secured by bolts 17 and nuts 18 to the upper section which is formed in the lower end of the connecting rod. A bushing 19 of bronze or other suitable material is arranged within the lower bearing and a bushing or sleeve 20 of similar material is arranged within the upper bearing. The lower bushing or sleeve is provided at its side with annular flanges 21 and it is also provided at the bottom with slots 22 which register with slots 23 in the lower detachable section of the lower bearing 4. These slots or grooves 22 and 23 are adapted to catch, retain and carry upward a portion of the lubricant contained within the crank case of the engine so that at each revolution of the crank shaft some of the lubricant will be thrown upward to the upper end of the connecting rod. The slots or grooves also permit the lubricant passing through the connecting rod to flow through the lower bearing back to the crank case or to the slots or grooves and to be again thrown upward.

The lubricant thrown upward by the connecting rod is caught by a tapered or funnel shaped receptacle 24 having a neck portion 25 which is mounted in a central opening 26' in the upper bearing. The lubricant receptacle 24 which catches a portion of the lubricant is provided at its sides with perforations or apertures 26 preferably formed by punching the material from the exterior to provide inwardly extending projections or spurs 27 which prevent lubricant going down the inner faces of the walls of the receptacle 24 from passing outward through the openings or apertures 26 to the exterior of the receptacle. This construction permits the lubricant to enter the receptacle through the perforations or apertures but prevents escape of the lubricant through the said apertures or perforations. The upper bushing 20 is provided with openings 28 and 29 for the passage of the lubricant which is adapted to flow around the upper pin 7 and a portion of the lubricant will flow downward through the passage 2 and lubricate the crank pin 30 of the crank shaft 31. The lower or inner bushing is provided with an aperture 32 to permit the lubricant to pass from the passage 2 and the opening 15 to the crank bend or crank pin of the crank shaft. In practice a sufficient amount of lubricant will be splashed or thrown upwardly and caught by the receptacle to efficiently lubricate the upper and lower bearings of the connecting rods.

What is claimed is:

1. In a splash system, a connecting rod arranged substantially vertically and having upper and lower bearings and provided with a longitudinal lubricant passage connecting the said bearings to permit lubricant to pass from the upper bearing to the lower bearing, the lower end of the pitman rod having a slot arranged to catch lubricant and throw the same upwardly, said slot also communicating with the lower bearing and forming an outlet for the lubricant passage to permit lubricant to flow therefrom to the exterior of the pitman and a receptacle carried by the upper end of the pitman and arranged to catch lubricant splashed upwardly by the lower end of the pitman and feed the said lubricant to the bearings.

2. A device of the class described, including a connecting rod, and a tapered receptacle carried by the connecting rod and adapted to catch lubricant thrown by the said rod, said receptacle being provided in its sides with perforations.

3. A device of the class described, including a connecting rod, and a tapered receptacle carried by the connecting rod and adapted to catch lubricant thrown by the said rod, said receptacle being provided in its sides with perforations and having projections or spurs extending inwardly from the perforations.

4. A device of the class described, including a hollow connecting rod provided with upper and lower bearings and having a passage extending from the upper to the lower bearing, a receptacle mounted on the upper end of the connecting rod for catching and feeding lubricant to the upper bearing and a threaded plug screwed into the hollow at the lower end thereof and having a lubricant passage.

5. A device of the class described, including a hollow connecting rod having upper and lower bearings and provided with inclined passages extending from the upper bearing and a plug secured in the lower end of the connecting rod and having a passage leading to the lower bearing.

6. A device of the class described, including a connecting rod having a passage extending from one end to the other of the said rod and a plug secured in the passage and having concave upper and lower faces and provided also with an opening forming a passage extending from one of the said faces to the other.

7. A device of the class described, including a hollow connecting rod having a passage extending from one end to the other and provided at its terminals with bearings, said connecting rods being provided at one end of the said passage with a substantially dome-shaped wall and having branch passages leading therefrom to the bearing at one end of the rod and a plug arranged within the said passage at the other end of the rod and having concave faces and provided also with an opening forming a passage connecting the said faces.

8. A device of the class described including a vertical connecting rod having a passage extending from one end to the other and connecting the bearings of the said rod, means carried by the lower end of the rod for splashing the lubricant upward, and means carried by the upper end of the rod for catching the lubricant and feeding the same to the said passage and constituting with the said lower means the sole means for feeding the lubricant to the passage of the connecting rod.

In testimony whereof we affix our signatures.

THOMAS MILTON FINLEY.
ALLEN W. BROWN.